US012565422B2

(12) United States Patent　　　(10) Patent No.: US 12,565,422 B2

Skoulidas et al.　　　(45) Date of Patent:　Mar. 3, 2026

(54) AMMONIA AND UREA PRODUCTION IN REVERSE FLOW REACTORS

(71) Applicant: EXXONMOBIL TECHNOLOGY AND ENGINEERING COMPANY, Annandale, NJ (US)

(72) Inventors: Anastasios I. Skoulidas, Pittstown, NJ (US); Everett J. O'Neal, Spring, TX (US); Ian J. Laurenzi, Hampton, NJ (US)

(73) Assignee: EXXONMOBIL TECHNOLOGY AND ENGINEERING COMPANY, Spring, TX (US)

(*) Notice: Subject to any disclaimer, the term of this patent is extended or adjusted under 35 U.S.C. 154(b) by 416 days.

(21) Appl. No.: 18/245,316

(22) PCT Filed: Sep. 16, 2020

(86) PCT No.: PCT/US2020/051003

§ 371 (c)(1),
(2) Date: Mar. 14, 2023

(87) PCT Pub. No.: WO2022/060355

PCT Pub. Date: Mar. 24, 2022

(65) Prior Publication Data

US 2023/0357003 A1　Nov. 9, 2023

(51) Int. Cl.
*C01B 3/26*　(2006.01)
*C01B 3/025*　(2026.01)
(Continued)

(52) U.S. Cl.
CPC ............... *C01B 3/025* (2013.01); *C01B 3/46* (2013.01); *C01B 3/48* (2013.01);
(Continued)

(58) Field of Classification Search
None
See application file for complete search history.

(56) References Cited

U.S. PATENT DOCUMENTS 3,194,636 A　7/1965　Mcevoy et al.
5,185,139 A　2/1993　Krishnamurthy et al.
(Continued)

FOREIGN PATENT DOCUMENTS

CN　1753833 A　3/2006
CN　1863730 A　11/2006
(Continued)

OTHER PUBLICATIONS

Notice of Allowance received for Japanese Patent Application No. 2023-517313, mailed on Aug. 20, 2024, 5 pages (3 pages of Original OA and 2 pages of English Translation).
(Continued)

*Primary Examiner* — Yun Qian
(74) *Attorney, Agent, or Firm* — Shook, Hardy & Bacon L.L.P.

(57) ABSTRACT

Systems and methods are provided for using a reverse-flew reactor (or another reactor with flows in opposing directions at different parts of a process cycle) as part of a reaction system for production of ammonia and/or urea. Using a reverse flow reactor as part of an ammonia production process can provide a variety of advantages, including direct heating of the reaction environment, and simplified genera-tion of multiple high-purity reagent streams for ammonia and/or urea synthesis.

7 Claims, 2 Drawing Sheets

(51) Int. Cl.
　　*C01B 3/46*　　　(2006.01)
　　*C01B 3/48*　　　(2006.01)
(52) U.S. Cl.
　　CPC　*C01B 2203/043* (2013.01); *C01B 2203/0445* (2013.01); *C01B 2203/0811* (2013.01); *C01B 2203/146* (2013.01)

(56)　　　　　　References Cited

U.S. PATENT DOCUMENTS

| | | | |
|---|---|---|---|
| 7,740,289 | B2 | 6/2010 | Tang |
| 7,815,873 | B2 | 10/2010 | Sankaranarayanan et al. |
| 8,754,276 | B2 | 6/2014 | Buchanan et al. |
| 2004/0170559 | A1 | 9/2004 | Hershkowitz et al. |
| 2004/0175326 | A1 | 9/2004 | Hershkowitz et al. |
| 2004/0191166 | A1* | 9/2004 | Hershkowitz ............. C01B 3/38 |
| | | | 423/652 |
| 2005/0201929 | A1 | 9/2005 | Hershkowitz et al. |
| 2007/0293709 | A1 | 12/2007 | Iaccino et al. |
| 2011/0250119 | A1 | 10/2011 | Mello et al. |
| 2012/0111315 | A1 | 5/2012 | Grenda et al. |
| 2014/0170052 | A1 | 6/2014 | Iaquaniello et al. |

FOREIGN PATENT DOCUMENTS

| | | | |
|---|---|---|---|
| CN | 101460429 | A | 6/2009 |
| CN | 103648970 | A | 3/2014 |
| CN | 104844480 | A | 8/2015 |
| JP | 04-227017 | A | 8/1992 |
| JP | 2000-159519 | A | 6/2000 |
| JP | 2007-524556 | A | 8/2007 |
| JP | 2008-127256 | A | 6/2008 |
| JP | 2012-512182 | A | 5/2012 |
| WO | 2002048027 | A1 | 6/2002 |

OTHER PUBLICATIONS

Office Action received for Korean Patent Application No. 10-2023-7011592, mailed on Apr. 9, 2025, 7 pages (4 pages of English Translation and 3 pages of Original Office Action).

International Search Report and Written Opinion received in PCT Application No. PCT/US2020/051003 mailed on Jun. 11, 2021, 8 pages.

Office action received for Chinese Patent Application No. 202080105154.0, mailed on Apr. 3, 2024, 12 pages (5 pages of Original OA and 7 pages of English Translation).

Office action received for Japanese Patent Application No. 2023-517313, mailed on Apr. 23, 2024, 8 pages (4 pages of Original OA and 4 pages of English Translation).

Notice of Allowance received for Chinese Patent Application No. 202080105154.0, mailed on Jun. 21, 2024, 4 pages (2 pages of Original OA and 2 pages of English Translation).

Office Action received for Canadian Patent Application No. 3191670, mailed on May 8, 2024, 3 pages.

Office action received for Chinese Patent Application No. 202080105154.0, mailed on Oct. 26, 2023, 16 pages (10 pages of Original OA and 6 pages of English Translation).

* cited by examiner

AMMONIA AND UREA PRODUCTION IN REVERSE FLOW REACTORS

FIELD OF THE INVENTION

This invention relates to methods for capture of $CO_2$ generated during operation of reverse flow reactors.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

One of the difficulties with reforming, of hydrocarbons is that a substantial amount of $CO_2$ is also produced. In addition to the $CO_2$ generated by the reforming reaction, the substantial heat requirements for performing a reforming reaction are typically provided by combustion of additional hydrocarbons, resulting in generation of additional $CO_2$. Thus, it would be desirable to have systems and/or methods of reforming hydrocarbons that could mitigate the impact of this substantial $CO_2$ production.

The substantial $CO_2$ generation associated with conventional reforming can impact a wide variety of industrial processes. For example, conventional ammonia production processes typically use steam methane reforming or autothermal reforming to provide the hydrogen that is needed for ammonia production. The Haber process is currently the primary industrial process for producing ammonia. It has been estimated that roughly 1% of global $CO_2$ emissions correspond to $CO_2$ produced to facilitate ammonia production via the Haber process. It would be desirable to have systems and methods that can reduce, minimize, and/or mitigate this $CO_2$ production during ammonia production and/or other related compounds.

U.S. Pat. No. 7,740,289 describes production of synthesis gas in a reverse flow reactor by steam reforming followed by incomplete combustion of remaining hydrocarbons at elevated temperature and pressure, in addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent Application Publication 2012/0111315 describes an in-situ vaporizer and recuperator that is suitable for use with an alternating flow system, such as a pressure swing reformer.

SUMMARY OF THE INVENTION

In an aspect, a method for performing reforming is provided. The method includes reacting a fuel mixture including a fuel stream, an oxygen-containing stream containing 10 vol % or less $N_2$ relative to a volume of the oxygen-containing stream, and a recycle stream under combustion conditions including a combustion pressure of 0.7 MPa-g or more in a combustion zone within a reactor. The reacting under the combustion conditions can form a flue gas and can heat one or more surfaces in a reaction zone to a regenerated surface temperature of 600° C. or more. The reaction zone can include a catalyst composition. The fuel mixture can include 0.1 vol % or more $O_2$ and 20 vol % or more $CO_2$ relative to a volume of the fuel mixture. The method can further include separating, from the flue gas, at least a portion of the recycle stream and a $CO_2$-containing stream comprising a second pressure of 0.5 MPa-g or more. The method can further include exposing a hydrocarbon-containing stream to the catalyst composition in the reaction zone at the regenerated surface temperature under reforming conditions to form a reforming product stream comprising $H_2$ and CO. A direction of flow for the hydrocarbon-containing stream within the reaction zone can be reversed relative to a direction of flow for the fuel mixture. The method can further include forming $H_2$-containing stream containing 50 vol % or more $H_2$ from at least a portion of the reforming product stream. The method can further include methanating at least a portion of the $H_2$-containing stream to form a methanated $H_2$-containing stream. Additionally, the method can include exposing the methanated $H_2$-containing stream to ammonia synthesis conditions in the presence of $N_2$ to form an ammonia-containing product. Optionally at least one of the recycle stream and the fuel mixture can include 15 vol % or less of $N_2$.

In another aspect, a method for performing reforming is provided. The method can include reacting a fuel mixture including a fuel stream and an oxygen-containing stream under combustion conditions in a combustion zone within a reactor. The reacting can form a flue gas and can heat one or more surfaces in a reaction zone to a regenerated surface temperature of 600° C. or more. The reaction zone can include a catalyst composition. The oxygen-containing stream can further include $N_2$. The fuel mixture can include 0.1 vol % or more $O_2$ relative to a volume of the fuel mixture. The method can further include separating from the flue gas, an $N_A$-containing stream containing 95 vol % or more $N_2$. The method can further include exposing a hydrocarbon-containing stream to the catalyst composition in the reaction zone at the regenerated surface temperature under reforming conditions to form a reforming product stream comprising $H_2$ and CO. A direction of flow for the hydrocarbon-containing stream within the reaction zone can be reversed relative to a direction of flow for the fuel mixture. The method can further include forming an $H_2$-containing stream containing 50 vol % or more $H_2$ from at least a portion of the reforming product stream. The method can further include methanating at least a portion of the $H_2$-containing stream to form a methanated stream. Additionally, the method can include exposing the methanated stream and at least a portion of the N-containing stream to ammonia synthesis conditions to form an ammonia-containing product.

In still another aspect, an ammonia synthesis system is provided. The system can include a reactor comprising a reactor inlet at a first end of the reactor, a regenerator inlet at a second end of the reactor, and a reaction zone including reforming catalyst. The system can further include a recycle loop providing intermittent fluid communication between the reactor inlet and the regenerator inlet, the recycle loop including a recycle compressor, a fuel source inlet, an oxygen-containing gas inlet, and a $CO_2$-containing gas outlet. The system can further include an air separation unit in fluid communication with the oxygen-containing gas inlet. The system can further include a pressure swing adsorption separator, the regenerator inlet being in intermittent fluid communication with the pressure swing adsorption separator. The system can further include a methanation stage in fluid communication with the regenerator inlet via the pressure swing adsorption separator. Additionally, the system can include an ammonia synthesis stage in fluid communication with the methanation stage.

DETAILED DESCRIPTION OF THE EMBODIMENTS

Figure 1:
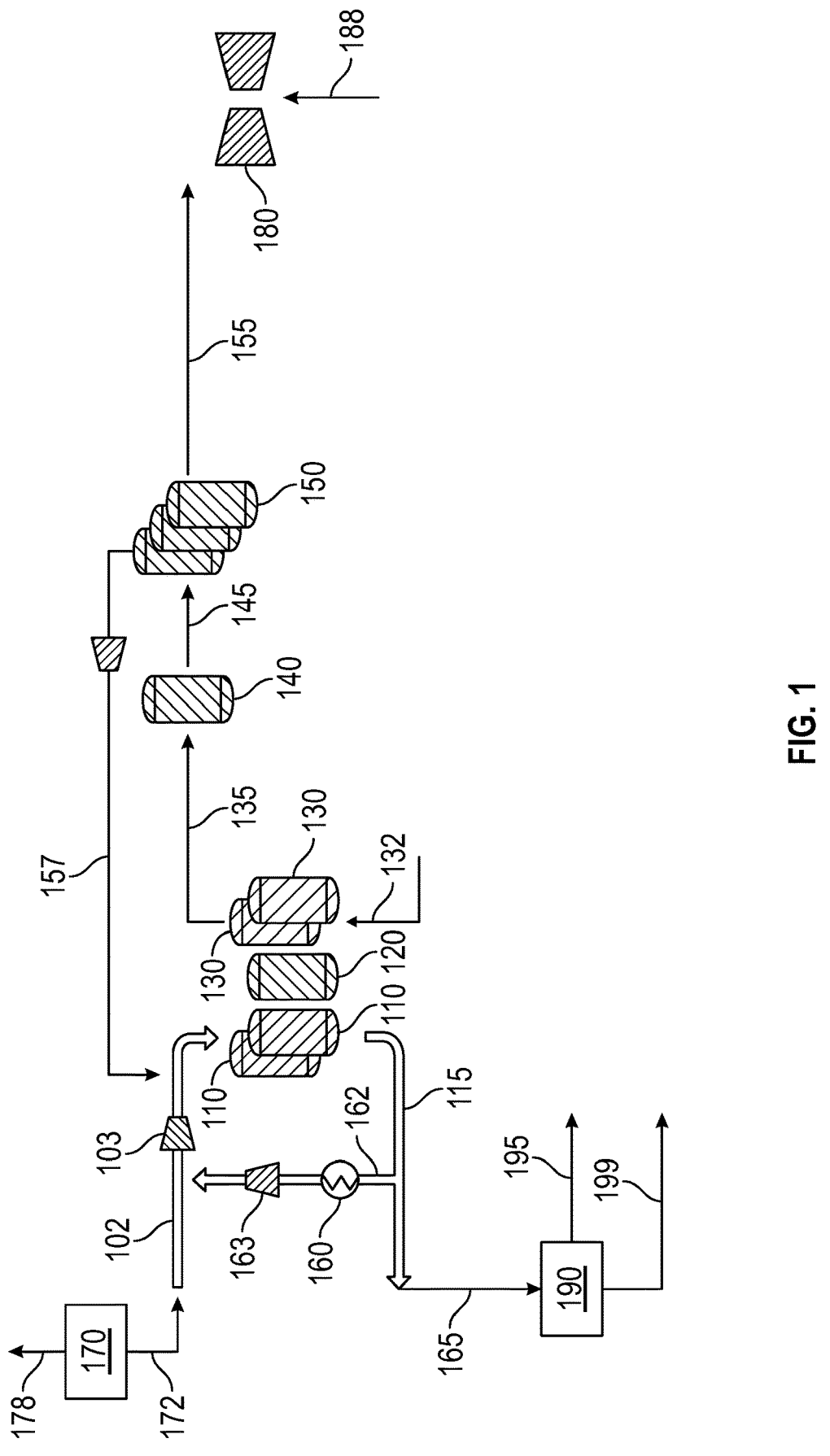
FIG. 1 shows an example of a configuration for using reverse flow reactors to perform hydrocarbon reforming while managing $CO_2$.

All numerical values within the detailed description and the claims herein are modified by "about" or "approximately" the indicated value, and take into account experimental error and variations that would be expected by a person having ordinary skill in the art.

Overview

In various aspects, systems and methods are provided for using a reverse flow reactor (or another reactor with flows in opposing directions at different parts of a process cycle) as part of a reaction system for production of ammonia and/or urea. Using a reverse flow reactor as part of an ammonia production process can provide a variety of advantages. In some aspects, using a reverse flow reactor to perform the hydrocarbon reforming reaction allows for direct heating of the reaction environment. During a reforming process cycle in a reverse flow reactor, heat is added to the reaction environment during the regeneration step of the process cycle by combustion of fuel in the reaction environment. This is in contrast to a steam methane reforming, where heating of the reaction environment is performed indirectly, either by heating components prior to entry into the reaction environment and/or transferring heat through the walls of the reactor. The ability to use direct heating rather than indirect heating means that thermal losses in the reverse flow reactor can be reduced or minimized relative to a conventional reforming process. This can provide a corresponding reduction in the amount of $CO_2$ generated during reforming of hydrocarbons. An additional benefit is that during each cycle, the regeneration step can combust any coke present on the reforming catalyst after the prior reforming step. This means that each reforming cycle can start with a catalyst that is substantially free of coke. This is in contrast to a conventional steam reformer configuration, where coke would accumulate for an extended period of time prior to removal.

As another example, using a reverse flow reactor to generate hydrogen can also allow fir generation of an oxygen-depleted flue gas while still oxidizing substantially all of the carbon in the flue gas. This is an unexpected synergy, as it is typically difficult to integrate the flue gas from the furnace of a conventional reforming unit with an ammonia production process. In a furnace environment, the burner(s) in the furnace are typically separated from the reactor vessel by a distance, with hear transfer from the burner(s) to the reactor vessel being accomplished primarily by gas convection. Based on this configuration, the same oxygen-containing gas environment used for operating the burner(s) is also used as the gas for transferring heat to the reactor vessel. In order to reduce or minimize the volume of flue gas that requires cleanup, the burner(s) are typically operated with a small excess of oxygen relative to the stoichiometric amount. However, at the temperatures used in a conventional reformer, and due the large operating environment volume of the furnace, operating with only a small excess of oxygen means that the flue gas from a furnace burner typically includes a substantial amount of CO as well as CO). Thus, in order to use the flue gas from a conventional furnace as a source for $CO_2$, the flue gas would need to be passed through an additional combustion step to convert the CO in the flue gas to $CO_2$. As an alternative, a conventional furnace environment could be operated with a larger excess of $O_2$ to allow for compete oxidation. However, this would result in both a more dilute flue gas, as well as a flue gas with an $O_2$ concentration more similar to the $O_2$ concentration of air. In this alternative operating mode, the more dilute nature of the $CO_2$ in the flue gas means any separation to form a high purity $CO_2$ stream would be more difficult. Additionally, attempting to generate a high purity $N_2$ stream would require something similar to an air separation unit. Because of the difficulties of using the flue gas from a conventional reforming unit, the flue gas generated from a conventional reforming unit is typically not integrated for use in an ammonia production process.

By contrast, the flue gas from the regeneration step of a reverse flow reactor can be both oxygen-depleted and fully oxidized. During the regeneration step for a reverse flow reactor, fuel is combusted in the presence of a small excess of oxygen, such as a 10 mol % to 30 mol % excess of oxygen relative to the stoichiometric amount of oxygen needed for complete combustion of the fuel. Because the combustion is performed in a volume where the fuel and oxygen are well-mixed, and because reforming in a reverse flow reactor is typically performed at a substantially higher temperature than steam methane reforming or autothermal reforming, this relatively small stoichiometric excess of oxygen can still be sufficient to cause substantially complete combustion of the fuel. Thus, the flue gas resulting from combustion can be substantially composed of $CO_2$, $H_2O$, any remaining $O_2$, and optionally nitrogen if air is used as at least part of the source for the oxygen. Because water can be removed in a relatively straightforward manner, the only additional separation needed to form a high purity $CO_2$ stream and a high purity $N_2$ stream from the flue gas of an RFR is a separation to remove the small remaining amount of oxygen. In various aspects, the flue gas from the regeneration step of a reverse flow reactor can have a CO content of 0.9 vol % or less, or 0.5 vol % or less, such as down to having substantially no CO content (~0.1 vol % or less). This is in contrast to the flue gas from the furnace of a conventional reforming unit, which can have a CO content of 1.0 vol % or more.

The above advantages can generally be realized by any configuration where a reverse flow reactor is used as part of an ammonia production process. Additional advantages of integrating a reverse flow reactor with an ammonia production process can be realized in aspects where an air separation unit is used to provide at least a portion of the oxygen for the regeneration step. First, using a high purity source of $O_2$ (such as an air separation unit) during regeneration can reduce, minimize, or possibly eliminate the presence of $N_2$ in the flue gas from the regeneration step. Removing the $N_2$ from the flue gas can substantially increase the concentration of $CO_2$ in the flue gas. When $N_2$ is removed from the reaction environment, the additional working fluid needed during the regeneration step can be provided, for example, by $CO_2$ and/or $H_2O$ generated from the flue gas during prior cycles. Because $CO_2$ and $H_2O$ both have substantially higher heat capacities than $N_2$, the amount of recycled flue gas that is needed as a working fluid can be significantly reduced. Using a higher beat capacity diluent can reduce laminar flame speed during combustion. Additionally, because the other primary component of the flue gas is water, which can be easily removed by condensation, using $O_2$ from a high purity source can facilitate formation of a high purity $CO_2$ stream. This can substantially simplify sequestration of $CO_2$ formed during the regeneration step. In some aspects, an $O_2$-containing (i.e., an oxygen-containing) stream from a high purity source can correspond to a stream containing 70 vol % or more $O_2$, or 90 vol % or more, or 95 vol % or more, or 98 vol % or more, such as up to being substantially composed of $O_2$ (up to 100 vol %, or less than 0.5 vol % of other components), in some aspects, a high purity $CO_2$-containing stream can have a $CO_2$ content of 80 vol % or more, or 90 vol % or more, or 95 vol % or more, such as up to being substantially composed of $CO_2$ (up to 100 vol %, or less than 0.5 vol % of other components).

Additionally, since the flue gas from the regeneration step now corresponds to a high purity $CO_2$ stream (either before or after removal of water), it can be beneficial to add any $CO_2$ separated from the reforming effluent to the $CO_2$ from the regeneration flue gas. Conventionally, the $CO_2$ from combustion flue gas is relatively dilute due to the substantial amount of nitrogen. Thus, any $CO_2$ sequestration performed on a conventional reforming process is performed only on the $CO_2$ separated (if any) from the synthesis gas product. The $CO_2$ separated from the synthesis gas product is typically not added to the combustion/regeneration flue gas, since this would result in dilution of the $CO_2$ separated from the synthesis gas. However, by using high purity $O_2$ as the source of oxygen during regeneration, the flue gas from a reverse flow reactor can have an increased concentration of $CO_2$, and can further have $H_2O$ as the other primary component. In this situation, the $CO_2$ separated from the reforming product can be combined with the $CO_2$ from the flue gas while having a reduced or minimized concern about difficulties in performing further separations on the combined stream prior to sequestration.

It is noted that conventionally, high purity $O_2$ would not typically be added to the furnace for a steam methane reformer without addition of some other type of diluent. Because the furnace for a steam methane reforming is performing indirect heating, a substantial amount of gas is needed to transfer the heat from combustion in the furnace to the reactor walls located within the furnace. The nitrogen from air is typically used to provide this gas. It is further noted that the exhaust products from a steam methane reformer is qualitatively different from the fie gas generated from an RFR reforming cycle. Steam methane reformers are typically operated at low pressure with a high exit temperature. This means that substantial waste heat is lost to the environment (or needs to be recovered as steam). Additionally, any $CO_2$ in the flue gas from a steam methane reformer is typically at a pressure of around 100 kPa. This is in contrast to an RFR, where the waste heat is minimized based on the nature of the design, and the resulting $CO_2$-containing flue gas can be at a pressure of 1.0 MPa-g or more, or 5.0 MPa-g or more, such as up to 15 MPa-g or possibly still higher. Minimized waste heat from the furnace minimizes the amount of oxygen which needs to be purified, which is beneficial for the efficiency and economics of the process.

In some aspects, instead of sequestering the high purity $CO_2$, the high purity $CO_2$ can be used as a reagent. For example, if it is desirable to produce urea from the ammonia, this high purity CO stream can be used with the ammonia to torn urea.

Still another benefit of using an air separation unit is that the nitrogen stream generated from the air separation unit can also be used as the $N_2$ input stream for the ammonia synthesis reaction.

In aspects where an air separation unit is used to provide $O_2$ for the regeneration step of the process cycle, still other benefits can potentially be achieved. For example, it has been discovered that using a working fluid with a higher heat capacity can mitigate one or more of the difficulties associated with handling large volumes of working fluid in the regeneration step for a reverse flow reactor. Using a higher heat capacity diluent gas can reduce the peak temperature that is produced during regeneration relative to the amount of fuel combusted. This can allow, for example, a reduction in the amount of working fluid that is used (to decrease the pressure drop across the reactor during the regeneration step) and/or an increase in the amount of fuel is used (to increase the efficiency of the subsequent reaction step).

The reduction in the volume of working fluid that is needed for heat transport can facilitate still another modification of the operation of the reverse flow reactor. By reducing the volume of working, fluid, the energy requirements for compressing the working fluid can be substantially reduced. This can make it practical to operate the regeneration step (i.e., the combustion step) for the reverse flow reactor at an elevated pressure, such as 07 MPa-g to 7.0 MPa-g, or 0.7 MPa-g to 15 MPa-g, or 1.0 MPa-g to 7.0 MPa-g, or 1.0 MPa-g to 15 MPa-g, or 3.4 MPa-g to 7.0 MPa-g, or 3.4 MPa-g to 15 MPa-g. High pressure gases can transfer heat within the reactor more efficiently than low pressure gases, but high pressure operation is typically avoided due to excessive costs for compressing the working fluid. However, by substantially reducing the volume of the working fluid, the cost for operating at high pressure can be mitigated while allowing the benefits of high pressure operation to be realized. Additionally, by operating at high pressure, a portion of the flue gas can be withdrawn during each cycle to form a high pressure $CO_2$-containing product gas that contains primarily $CO_2$ and $H_2O$. After removing water, this high pressure $CO_2$-containing product gas can be at or near a pressure where $CO_2$ can be used for other purposes.

Yet another modification of the operation of the reverse flow reactor can be to use a portion of reformed product as the fuel for the regeneration step. In particular, after reforming, a separation can be performed to separate $H_2$ from a remainder or tail gas product containing a majority of the CO and $CO_2$ in the reforming product. This can be accomplished, for example, by using pressure swing adsorption to separate the carbon oxides in the reforming product from $H_2$. During pressure swing adsorption, the carbon oxides can be adsorbed while $H_2$ passes through the adsorber to form an $H_2$-enriched product. $H_2$ can then be used as a sweep gas for desorption of the carbon oxides from the adsorber. The resulting tail gas from this desorption step can be used as a portion of the fuel for the regeneration step. This can allow the CO and $CO_2$ generated during reforming to also be incorporated into the flue gas.

In aspects where the tail gas from separation of the reformer product is used as a portion of the fuel for the regeneration step, still a further modification can be to control the water gas shift reaction conditions so that the tail gas is enriched in CO. Typically, when a reforming reaction is performed for generation of $H_2$, a subsequent water gas shill reaction step is performed to increase or maximize the ratio of $H_2$ to CO in the product. However, in terms of lower heating value per oxygen atom consumed during combustion, CO is a higher heat potential fuel than either $CH_4$ or $H_2$. Thus, retaining additional CO in the tail gas can reduce the amount of oxygen that is needed to generate a desired level of heat by combustion in the generator. It is noted that the combined amount of CO plus $CO_2$ in the tail gas is not changed by retaining additional CO in the tail gas. However, by reducing the amount of oxygen needed to generate a desired amount of heat, the amount of oxygen-containing gas produced by the air separation unit can be reduced. This provides an additional energy benefit, as an air separation unit typically has relatively high energy consumption per unit of oxygen-containing gas produced.

Although benefits can be realized by using an air separation unit to provide, a high purity $O_2$ stream for the regeneration step, in some aspects it may be desirable to use air (and/or another stream that contains 30 vol % or more of nitrogen) as the oxygen-containing stream for regeneration. In such aspects, $N_2$ can optionally be separated from the flue gas for use as the $N_2$-containing stream for ammonia synthesis. In such optional aspects where $N_2$ derived from the regeneration flue gas is used as at least part of the $N_2$ input flow for ammonia synthesis, it may be desirable to reduce or minimize the $O_2$ content of the flue gas. The reaction environment for ammonia synthesis should be substantially free of $O_2$, so any $O_2$ present in an $N_2$-containing stream would need to be removed. One option for producing an N-containing stream that is substantially free of $O_2$ is to perform the regeneration step using an excess of fuel, so that substantially all $O_2$ introduced into the regeneration step is used for combustion of either fuel or coke. It is noted that having an excess of fuel could result in some formation of CO and/or could result in incomplete coke removal from the reforming catalyst during regeneration. But operating with such an excess of fuel can also minimize or eliminate the need to separate $O_2$ from any $N_2$-containing stream derived from the regeneration flue gas.

In aspects where an excess of fuel is used to reduce or minimize the need to separate $O_2$ from the flue gas, another option can be to use $H_2$ from the reforming process as the fuel for regeneration. In such aspects, using an excess of hydrogen product from the process as fuel for the regeneration step can generate a regeneration flue gas that is substantially composed of $N_2$ and $H_2O$, with very little carbonaceous contaminants. Such a regeneration flue gas can be low in both $CO_2$ and $O_2$ content, so that only an optional separation step to remove water would be needed to use the $N_2$ for the ammonia synthesis.

In this discussion, unless otherwise specified, description of temperatures within the reaction zone corresponds to temperatures measured at the location where the maximum temperature occurs in the reaction zone at the end of the regeneration step. The location of the maximum temperature in the reaction zone at the end of the regeneration step is typically at or near the boundary between the reaction zone and the recuperation zone. The boundary between the reaction zone and the recuperation zone is defined as the location where the catalyst for the endothermic reaction begins in the reactor.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

Ammonia and Urea Production

Ammonia can typically be made from $H_2$ and $N_2$ via the Haber-Bosch process at elevated temperature and pressure. Conventionally, the inputs can be a) purified $H_2$, which can be made from a multi-step process that can typically require steam methane reforming, water gas shift, water removal, and trace carbon oxide conversion to methane via methanation; and b) purified $N_2$, which can typically be derived from air via pressure swing adsorption and/or an air separation unit.

In various aspects, instead of generating $H_2$ by steam methane reforming, the $H_2$, for ammonia production can be produced by hydrocarbon reforming using a reverse flow reactor. For ammonia synthesis, the hydrogen stream can preferably be substantially free of impurities such as $H_2S$. In some aspects, a methane feed and/or other hydrocarbon feed can be used as the feed for reforming in the reverse flow reactor(s), so that an $H_2$-containing product that is substantially free of sulfur is produced. Alternatively, if the hydrocarbon feed includes sulfur, a sulfur removal step can be performed prior to reforming and/or after reforming so that an $H_2$ stream can be produced that is substantially free of sulfur impurities.

The output flow from reforming in a reverse flow reactor can correspond to a synthesis gas that includes CO, $CO_2$, $H_2$, and $H_2O$. Since $H_4$ is the desired output, the reforming output can optionally be passed through a water gas shift reaction stage to increase the $H_2$ content (and thereby decrease the CO content) of the output stream. Water-gas shift is a well-known reaction, and typically can be done at "high" temperatures (from about 300° C. to about 500° C.) and "low" temperatures (from about 100° C. to about 300° C.) with the higher temperature catalyst giving faster reaction rates, but with higher exit CO content, followed by the low temperature reactor to further shift the syngas to higher $H_2$ concentrations.

After any optional water gas shift process(es), the optionally shifted reforming output can undergo separation via one or more processes to purify the Hz. This can involve, for example, condensation of the water, removal of $CO_2$ and/or purification of the $H_2$ to remove other impurities. This can allow for formation of an $H_2$-containing stream having an $H_2$ content of 98 vol % or more, or 99 vol % or more, or 99.9 vol % or more, such as up to being substantially composed of $H_2$ (up to 100 vol %, or less than 0.05 vol % of other components).

The resulting $H_2$ stream can then be passed through a methanation step at elevated pressure (typically about 15 barg to about 30 barg, or about 1.5 MPag to about 3 MPag) to ensure that as many carbon oxides as possible can be eliminated. CO can potentially be a difficult compound to separate from $H_2$. Performing methanation can convert CO (and any remaining $CO_2$) to $CH_4$. This is beneficial prior to an ammonia synthesis process, as ammonia synthesis catalysts are typically sensitive to the presence of CO but not $CH_4$. Optionally, the $N_2$ stream for the ammonia synthesis process can also be passed through the methanation stage. Optionally, the methanated stream can be passed through a molecular sieve or other trap for CO and $H_2O$ to further remove these species to ppm levels or lower.

After methanation, the $H_2$ stream and $N_2$ stream can be compressed to ammonia synthesis conditions of 60 barg (~6.0 MPag) to 180 barg (~18 MPag). Typical ammonia synthesis processes can be performed at 350° C. to 500° C., or 350° C. to 450° C. or less. Although these conditions are effective for ammonia synthesis, such conditions can result in low conversion per pass (typically less than about 20%) and therefore a large recycle stream.

Urea is another large chemical product that can be made by the reaction of ammonia with $CO_2$. The basic process, developed in 1922, is also called the Bosch-Meiser urea process after its discoverers. The various urea processes can be characterized by the conditions under which urea formation takes place and the way in which unconverted reactants are further processed. The process can consist of two main equilibrium reactions, with incomplete conversion of the reactants. The net heat balance for the reactions can be exothermic. The first equilibrium reaction can be an exothermic reaction of liquid ammonia with dry ice (solid $CO_2$) to form ammonium carbamate ($H_2N$—$COONH_4$):

$$2NH_3 + CO_2 \rightleftharpoons H_2N\text{—}COONH_4$$

The second equilibrium reaction can be an endothermic decomposition of ammonium carbamate into urea and water:

$$H_2N\text{—}COONH_4 \rightleftharpoons (NH_2)_2CO + H_2O$$

The urea process can use liquefied ammonia and $CO_2$, at high pressure as process inputs. In prior art processes, carbon dioxide is typically provided from an external resource where it must be compressed to high pressure. In contrast, the flue gas from the regeneration step of a reverse flow reactor can be at an elevated pressure, and therefore the flue gas from a reverse flow reactor can potentially produce a high pressure carbon dioxide stream suitable for reaction with the liquid ammonia product from the ammonia synthesis reaction.

In various aspects, the urea process can be integrated into a combined system with an ammonia synthesis process and one or more reverse flow reactors for providing the $H_2$ input for the ammonia synthesis process. This integrated approach can reduce and/or eliminate many processes from the conventional approach, which can require an ammonia plant (steam reformer, water gas shift, pressure swing adsorption to produce $H_2$+air separation plant) plus a separate supply of $CO_2$ typically made remotely and then transported to the plant. The current system can eliminate many of these processes, as well as providing $CO_2$ for use in forming the urea. Specifically, rather than transport $CO_2$ as dry ice for use at a remote urea plant, carbon dioxide can be provided from separation of the flue gas formed during the regeneration step of the reverse flow reactor.

Integrated Reaction System Examples

Figure 2:
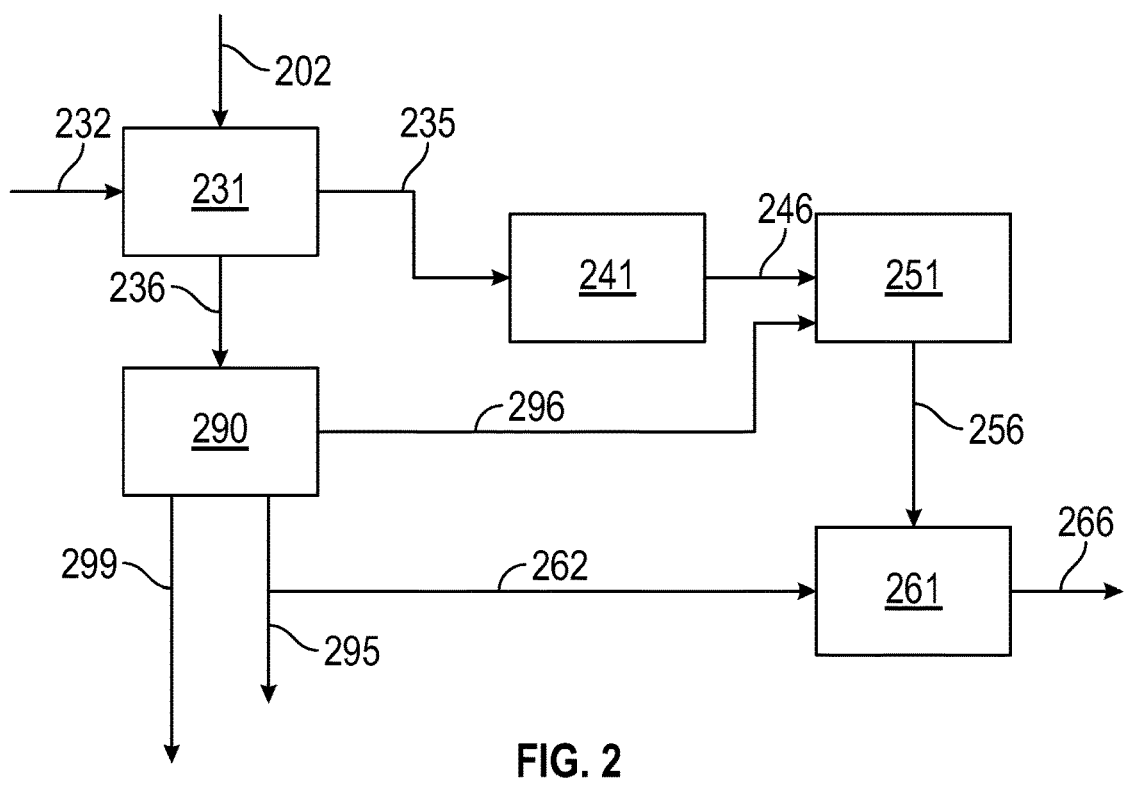
FIG. 2 shows an example of a configuration for using reverse flow reactors as part of an integrated system for ammonia production and/or urea production.

FIG. 2 shows an example of reaction system that uses one or more reverse flow reactors to perform hydrocarbon reforming as part of an integrated process for production of ammonia and/or urea. In the example configuration shown in FIG. 2, the oxidant for the regeneration step in the reverse flow reactor(s) is provided by using air as a source of oxygen.

In the example configuration shown in FIG. 2, one or more reverse flow reactors 231 are used to perform a reforming reaction in order to provide hydrogen for ammonia synthesis. The reverse flow reactors 231 perform a cyclic process, with different inputs and output depend on what step in the process is occurring in an individual reactor. During a reforming step, an input flow 232 including methane and/or natural gas (and/or another hydrocarbon) and optionally steam is introduced into the one or more reverse flow reactors 231. This generates an output flow that includes $H_2$. After performing an optional water gas shift process (not shown) and/or one or more separations (not shown), an $H_2$ output flow 235 can be produced. During a regeneration step, a regeneration input flow 202 including air and fuel can be passed into the one or more reverse flow reactors 231. Optionally, the air and fuel can be introduced as separate flow streams (not shown). The regeneration step produces a flue gas 236 that includes $N_2$, $H_2O$, and $CO_2$. The flue gas 236 can be separated 290 in one or more separation stages to produce a high purity nitrogen stream 296, a high purity $CO_2$ stream 295, and a stream containing $H_2O$ 299.

The $H_2$ output flow 235 can be passed into a methanation stage 241. The methanation stage can convert any CO presence in the $H_2$ output flow 235 into $CH_4$. In the example shown in FIG. 2, the resulting methanated stream 246 containing $H_2$ can then be passed into an ammonia synthesis stage 251, along with high purity nitrogen stream 296. Ammonia synthesis stage 251 can correspond to any convenient type of ammonia synthesis process, such as a Haber process. Optionally, at least a portion of ammonia product stream 256 can be used as an input flow for urea synthesis stage 261 to form urea 266. In such an optional aspect, a portion 262 of the high purity $CO_2$ stream 295 can also be used as an input for the urea synthesis stage.

Figure 3:
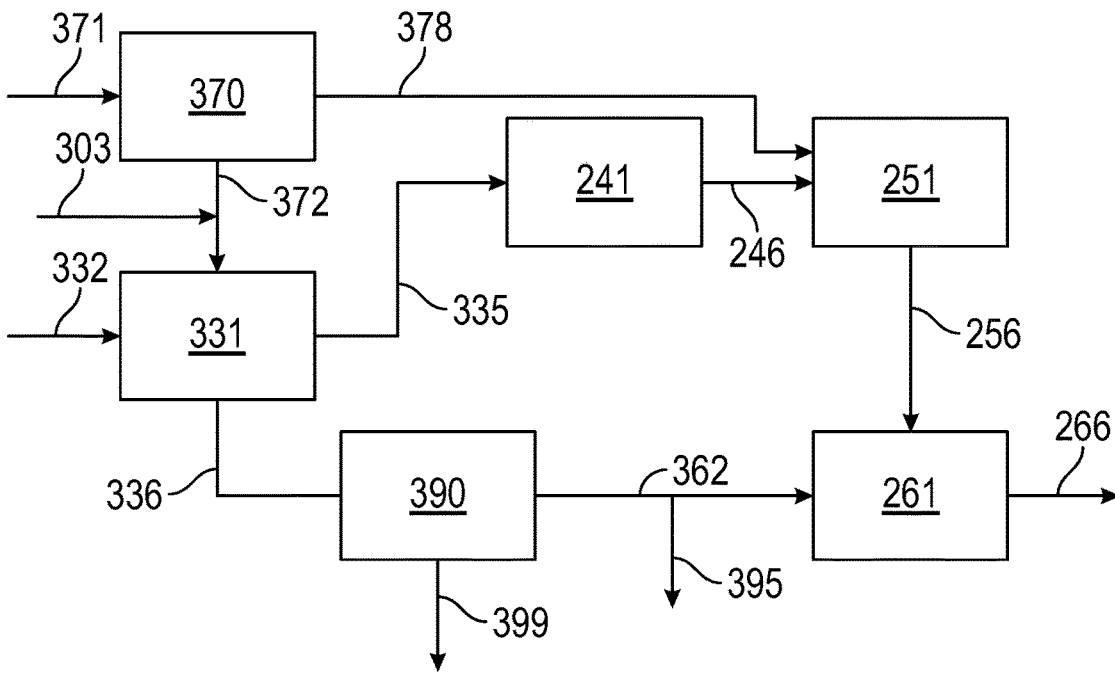
FIG. 3 shows another example of a configuration for using reverse flow reactors as part of an integrated system for ammonia production and/or urea production.

FIG. 3 shows a variation on the reaction system shown in FIG. 2 where an air separation unit is used to provide a higher purity oxygen stream to the regeneration step of the reverse flow reactors. In FIG. 3, reverse flow reactors 331 receive an input flow 332 during the reforming step. After performing suitable separations and/or water gas shift reactions, an $H_2$-containing stream 335 can be formed.

During the regeneration step, the reverse flow reactors 331 can receive a fuel stream 303 and an oxygen-containing stream 372, FIG. 3 shows fuel stream 303 being combined with oxygen-containing stream 372 prior to entering reverse flow reactors 331, but in other aspects the fuel stream 303 and oxygen-containing stream 372 can be introduced separately. Oxygen-containing stream can be generated at least in part by passing air 371 into an air separation unit 370. Oxygen-containing stream 372 can have an elevated oxygen content, so that the nitrogen content of oxygen-containing stream is 30 vol % or less, or 10 vol % or less, or 1.0 vol % or less. Because a reduced or minimized amount of nitrogen is introduced into reverse flow reactors 331 during the regeneration step, the resulting, flue gas 336 can include primarily $H_2O$ and $CO_2$. A separation stage 390 can be used to separate water 399 from a high purity $CO_2$ stream 395.

In the configuration shown in FIG. 3, the methanation step 241 can receive I-h-containing stream 335 as an input. The high purity $N_2$ stream 378 can also be passed into methanation stage 241. In the configuration shown in FIG. 3, if urea production is desired, at least a portion 362 of high purity $CO_2$ stream 395 can be used as an input flow.

Reverse Flow Reactor Configuration Example

FIG. 1 shows an example of a reaction system suitable for integrating carbon capture with hydrocarbon reforming in a reaction system including reverse flow reactors. In the example shown in FIG. 1, the reaction system includes multiple reverse flow reactors. Although a total of five reactors are shown in FIG. 1, it is understood that any convenient number of reactors can be used. By using multiple reactors, a continuous or substantially continuous stream of reaction product can be provided as input to downstream parts of a refinery, chemical plant, or other facility.

In FIG. 1, the two reactors 110 correspond to reactors in the regeneration portion of the reaction cycle. The two reactors 130 correspond to reactors in the endothermic reaction (reforming) portion of the reaction cycle. For example, reactors 130 can be performing steam reforming, where an input stream 132 of steam and methane (and/or other reformable organics) is converted to a reforming effluent 135. Reactor 120 corresponds to a reactor that is in-between the regeneration and reaction portions of the cycle. Depending on the length of each portion of the cycle, reactor 120 can alternatively correspond to another reactor in the regeneration portion of the cycle or another reactor in the reaction portion of the cycle. It is understood that the representation in FIG. 1 corresponds to a snapshot of the system at a given point in time. As the reaction cycle continues, the individual reactors will progress from reaction to regeneration and back again to reaction. It is noted that the reverse flow reactors 231 in FIGS. 2 and/or 331 in FIG. 3 can optionally correspond to reactors 110, 120, and 130 from FIG. 1.

During regeneration, fuel and oxidant feed mixture 102 is passed into the reactors in the regeneration step, such as reactor(s) 110. The fuel and oxidant mixture 102 can be pressurized 103 to a desired pressure prior to being passed into reactor(s) 110. In addition to fuel and oxidant feed 102, reactors in regeneration also receive flue gas as a working fluid. In the configuration shown in FIG. 1, a first portion 162 of the flue gas 115 from reactor(s) 110 is passed through a heat recovery stage, such as a waste heat boiler 160, followed by compression 163 to increase the recycled flue gas to the same pressure as fuel and oxidant feed mixture 102 prior to combining the flows. The remaining portion 165 of flue gas stream 115 is passed out of the reaction system, in order to maintain a desired level of gas within the reaction system. In the example shown in FIG. 1, the remaining portion 165 is passed into separation stage 190 to remove water 199. This results in a high purity, high pressure $CO_2$-containing stream 195.

In FIG. 1, the flow path corresponding to flue gas 115; the first portion 162; and the line where first portion 162 is combined with fuel mixture 102, corresponds to a recycle loop. The recycle loop provides fluid communication between the reactor inlet end of reactor(s) 110 and the regenerator inlet end of reactor(s) 110. The fluid communication is intermittent, as the fluid communication is only provided during the regeneration step. This can be managed, for example, by appropriate use of valves.

The fuel and oxidant feed mixture 102 can be formed by combining fuel with an oxygen-containing stream 172. The oxygen-containing stream 172 can be, for example, an oxygen-enriched stream produced by an air separation unit 170. Air separation unit 170 can also produce a nitrogen-containing stream 179. Nitrogen-containing stream can optionally be used as a diluent fluid or working fluid 188 for a turbine 180 to provide power. The power from turbine 180 can be used, for example, as power for air separation unit 170. The fuel can at least partially correspond to a tail gas 157 derived from separating $H_2$ from remaining components in the reforming effluent. To the degree that additional fuel is needed, any convenient type of hydrocarbon can be used, such as methane or natural gas.

In the configuration shown in FIG. 1, after exiting from the reactor(s) 130, the reforming effluent 135 is passed into a water gas shift reactor 140 to produce a shifted synthesis gas product 145. Water gas shift reactor 140 can be used to increase the molar ratio of $H_2$ to CO in the shifted synthesis gas product 145. The $H_2$ to CO molar ratio in the reforming effluent 135 is typically near 3:1. In some aspects, water gas shift reactor 140 can be used to create a shifted synthesis gas product 145 with a reduced or minimized CO content, such as having a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more. It is noted that because oxygen-containing stream 172 is formed by an air separation unit, a reduced or minimized amount of diluent gas (such as nitrogen) is included in the shifted synthesis gas product. In other aspects, a smaller amount of CO reduction can be performed, in such aspects, the ratio of $H_2$ to CO in the shifted synthesis gas product can be between 4.0 and 10, or between 4.0 and 8.0. This can increase the fuel value of the tail gas stream 157 that is used as part of the fuel for regenerating reactor(s) 110.

The shifted synthesis gas product 145 can then be separated using one or more swing adsorption reactors 150 to produce a hydrogen-enriched stream 155 and tail gas 157.

In the example configuration shown in FIG. 1, the outlet(s) of the swing adsorption reactor(s) 150 that exhaust tail gas stream 157 can be in intermittent fluid communication with the recycle loop. Such intermittent fluid communication can be managed, for example, by appropriate use of valves.

Modification of Regeneration Step—Input Flows and Operating Conditions for Regeneration Reverse flow reactors and/or other reactors with flows in opposite directions at different stages of a reaction cycle can be useful when performing endothermic reactions at elevated temperatures, such as temperatures of 600° C. or more, or 800° C. or more. A flow from a first direction, sometimes referred to as a combustion flow, regeneration flow, or fuel mixture, can be used to heat one or more surfaces of a reaction zone within the reactor to a desired temperature. The reagents for a desired endothermic reaction can then be passed in using a flow in the opposite direction. The heat stored within the reactor during the regeneration step is used to provide heat for the desired endothermic reaction.

One of the challenges in operating a reverse flow reactor is managing the introduction of heat during the regeneration step. Introducing a larger amount of heat into the reactor during the regeneration step can allow for an increased amount of the corresponding endothermic reaction during the reaction step. However, the amount of heat that can be introduced is constrained by the need to avoid excessive temperature spikes in localized areas. For example, performing too much combustion at a single location could result in exceeding a maximum temperature for the structural materials and/or internal components of the reactor.

In order to overcome this difficulty, a working fluid can be introduced during the regeneration step as part of the fuel mixture. The reactor can also be pressurized during regeneration to increase the amount of working fluid per unit volume. The working fluid absorbs a portion of the heat generated during combustion and carries the heat to downstream locations within the reactor (relative to the direction of flow in the regeneration step). This can allow additional heat to be introduced into the reactor while reducing the maximum temperature at any location. Thus, the input flows during regeneration of a reverse flow reactor can correspond to a combination of fuel, an oxygen-containing stream, and a working fluid. In various aspects, one or more of the fuel, the oxygen-containing stream, and the working fluid can be modified to alloy for production of a high pressure $CO_2$-containing gas.

In some aspects, a substantial portion of the working fluid used in a reverse flow reactor regeneration step corresponds to nitrogen, which is a relatively low heat capacity gas. Such a working fluid can be formed by using recycled flue gas as the working fluid while also using air as the oxygen source for combustion. In such a configuration, nitrogen can correspond to 50 vol % or more of the flow into a reactor during the regeneration step, and the volume of nitrogen can potentially be as much as an order of magnitude greater (or more) than the amount fuel that is introduced to generate heat (volume basis). This large volume of working fluid can result in substantial pressure drops within a reactor, leading to additional operating costs for compression. Larger reactor sizes can mitigate the pressure drops, but such increases in reactor size can create other processing difficulties. Additionally, increasing reactor footprint within a refinery is typically a less desirable outcome.

Instead of using air as the oxygen source for combustion, in some other aspects the oxygen source for combustion can correspond to an oxygen-containing stream that contains substantially less nitrogen than air and/or more oxygen than air. For example, an oxygen-containing stream can be used that contains 30 vol % or more of oxygen, or 50 vol % or more, or 70 vol % or more, such as up to being substantially composed of oxygen (up to 100 vol %, or less than 0.5 vol % of other components). Additionally or alternately, the nitrogen content of the oxygen-containing stream can be 30 vol % or less, or 15 vol % or less, or 10 vol % or less, or 1.0 vol % or less, such as down to having substantially no nitrogen content (0.1 vol % or less). An air separation unit can generate oxygen-containing streams that have elevated oxygen contents and/or reduced nitrogen contents.

Reducing the amount of nitrogen present in the combustion environment results in a corresponding reduction in the amount of nitrogen in the flue gas. As a result, a second modification of the regeneration step can be to use a working fluid that contains a reduced or minimized amount of nitrogen.

Because the working fluid corresponds to recycled flue gas, the combustion products from previous cycles are included in the working fluid. This means that the working fluid can include both $CO_2$ and $H_2O$. In various aspects, the working fluid can include 20 vol % or more $CO_2$, or 25 vol % or more, or 30 vol % or more, or 40 vol % or more, such as up to 100 vol %, In some aspects, the working fluid can include 20 vol % to 60 vol % $CO_2$, or 25 vol % to 60 vol %, or 30 vol % to 60 vol %, or 20 vol % to 50 vol %, or 25 vol % to 70 vol %. Optionally, the working fluid can include 10 vol % or more of $H_2O$, or 20 vol % or more, or 40 vol % or more, such as up to 70 vol % or possibly still higher. If desired, a water separation step could be included as part of a flue gas recycle loop to reduce the amount of $H_2O$ in a working fluid. In some aspects, the working fluid can include 95 vol % to 100 vol % of $CO_2$ and $H_2O$, or 98 vol % to 100 vol %. It is noted that if the working fluid corresponded entirely to the combustion products formed from stoichiometric combustion of methane, the working fluid would have a composition of roughly 33 vol % $CO_2$ and 67 vol % $H_2O$. Depending on the aspect, the working fluid can contain 15 vol % or less of $N_2$, or 10 vol % or less, or 5 vol % or less, or 2.0 vol % or less, such as down to having substantially no $N_2$ content (0.1 vol % or less). This is in contrast to configurations for reforming of hydrocarbons in a reverse flow reactor where air is used to provide the oxidant during regeneration. In such aspects, 40 vol % or more of the working fluid can correspond to $N_2$.

In some aspects, the fuel for the regeneration step can correspond to a conventional hydrocarbon fuel, such as methane or natural gas, in other aspects, the fuel can correspond to a mixture of a hydrocarbon fuel (such as methane) and a recycled tail gas from separation of the reforming effluent. When a recycled tail gas is included as part of the fuel, the resulting fuel mixture (fuel plus working fluid plus oxygen-containing gas) can include 2.0 vol % or more of CO, or 5.0 vol % or more, or 8.0 vol % or more, such as up to 15 vol % or possibly still higher. A tail gas for recycle can be formed, for example, by separating hydrogen from the reforming effluent using a swing adsorber.

Reducing or minimizing the nitrogen content of the input flows to the regenerator can facilitate performing regeneration at a substantially higher pressure. Conventionally, regeneration in a reverse flow reactor is performed at a pressure similar to the desired pressure for performing the corresponding endothermic reaction. When a reverse flow reactor is used for reforming, this can correspond to performing the regeneration at a pressure between 0.5 MPa-g and 3.0 MPa-g. With a recycled flue gas containing substantial amounts of $N_2$, operating the regeneration at higher pressures would require an undesirable increase in compression costs. This is due to the large volumes of $N_2$ that are needed to compensate for the low heat capacity of $N_2$. In some aspects where the working fluid includes a reduced or minimized amount of $N_2$, the regeneration step can be performed using combustion conditions corresponding to a pressure of 0.5 MPa-g to 7.0 MPa-g, or 0.7 MPa-g to 7.0 MPa-g, or 1.4 MPa-g to 7.0 MPa-g, or 3.4 MPa-g to 7.0 MPa-g. In other aspects, higher pressure combustion conditions can be used, such as a combustion pressure of 0.7 MPa-g to 15 MPa-g, or 14 MPa-g to 15 MPa-g, or 3.4 MPa-g to 15 MPa-g, or 7.5 MPa-g to 15 MPa-g.

Operating the regenerator at high pressure regeneration/combustion conditions can provide several advantages. First, high pressure operation can facilitate heat transfer within the reverse flow reactor, resulting in a more evenly distributed heat profile after regeneration. Second, by forming a high pressure flue gas that contains primarily $CO_2$ and $H_2O$, a portion of the flue gas can be used as a $CO_2$ stream for sequestration or other uses after minimal additional processing.

After passing through the reactor, the flue gas from the regenerator can be compressed to return the flue gas to the pressure for use as a working fluid for regeneration. Before or after compression, a portion of the flue gas can be separated out as a $CO_2$-containing product stream. The water in the $CO_2$-containing product stream can be removed by cooling the $CO_2$-containing product stream, such as by heat exchange. In continuous flow operation, this can be performed while roughly maintaining the pressure of the $CO_2$-containing stream. This can result in a $CO_2$-containing stream with a $CO_2$ content of 80 vol % or more, or 90 vol % or more, or 95 vol % or more, such as up to containing substantially only $CO_2$ (less than 0.1 vol % of other components, or 99.9% or more $CO_2$). The $CO_2$-containing stream can then be passed into a sequestration process. Alternatively, the $CO_2$-containing stream can be used as an input for a process that uses $CO_2$ such as dry ice production or injection into a hydrocarbon extraction site. Generally, sequestration and/or use of $CO_2$ is performed at a pressure of roughly 7.0 MPa-g or more, or 14 MPa-g or more, such as up 20 MPa-g or possibly still higher. Thus, operating the regeneration step of the reverse flow reactor at an elevated pressure can allow the heat transfer benefits of high pressure operation to be realized while also producing a $CO_2$-containing stream that is at a desirable pressure for further use.

In addition to the above advantages, it has been discovered that using a higher heat capacity gas as the diluent during the regeneration step can provide an unexpected decrease in the laminar flame speed of the combustion reaction at temperatures of 600° C. or more. A higher laminar flame speed corresponds to faster combustion. Decreasing the laminar flame speed of the combustion reaction during the regeneration step can expand the distance within the reactor where the combustion reaction occurs. This spreading out of the combustion region can provide a further unexpected reduction in maximum temperature when combustion is performed at temperatures of 600° C. or more, or 700 or more, or 800° C. or more, such as up to 1500° C. or possibly still higher. In some aspects, addition of a high heat capacity gas to the diluent can reduce the laminar flame speed at temperature of 600° C. or more, or 700° C. or more, or 800° C. or more, to 100 cm/s or less, or 75 cm/s or less. It is noted that the decrease in laminar flame speed may be due in part to improved radical quenching by the higher heat capacity gas.

Processing of Reforming Effluent—Water Gas Shift and Swing Adsorption

In some aspects, one of the modifications to the fuel mixture for the regeneration step can be to modify the fuel by adding a tail gas from separation of the reforming effluent. In such aspects, the processing and separation of the reforming effluent can also be modified to provide a tail gas with an increased CO content.

Although hydrogen is the desired output when hydrocarbon reforming is performed as part of an ammonia synthesis process, the nature of a hydrocarbon reforming reaction also results in production of carbon oxides. The carbon oxides are typically a mixture of CO and $CO_2$, with the ratio of CO to $CO_2$ being at least partially selected by subsequently exposing the reforming effluent to a water gas shift catalyst under appropriate conditions. In some aspects, when hydrogen is the desired output from reforming, the effluent can be shifted to increase or maximize H production. This also results in increased $CO_2$ production. A separation can then be performed to provide a high purity $H_2$ stream and one or more remaining portions that include the $CO_2$.

In other aspects, carbon oxides from the reforming effluent can be added to the input flows for regeneration as part of a tail gas that is added to the fuel. In such aspects, it can be desirable to retain additional CO during the water gas shift reaction, so that the tail gas has an increased CO content. The tail gas can be formed, for example, by separating hydrogen from the reforming effluent using swing adsorption, such as pressure swing adsorption.

After reforming, the reforming effluent can first be exposed to a water gas shift catalyst in order to modify the ratio of $H_2$ to CO in the reforming effluent. The water gas shift reaction is a fast equilibrium reaction. The stoichiometry of the water gas shift reaction is shown in Equation (1).

$$H_2O+CO<=>H_2+CO_2 \qquad (1)$$

Generally, the water gas shift reaction can be performed at temperatures of 250° C. or more. A variety of catalysts are available that provide water gas shift reaction activity. Catalysts with reforming activity, such as nickel or rhodium based catalysts, typically also have activity for the water gas shift reaction. Other transition metals such as iron and copper can also have activity for the water gas shift reaction.

During conventional $H_2$ production, the conditions for the water gas shift reaction are typically selected to reduce the CO concentration in the reforming effluent by roughly 90%. For example, by including excess steam during reforming and/or using excess steam when exposing the reform ting effluent to a water gas shift catalyst, the equilibrium can be driven toward production of $H_2$ and $CO_2$ at the expense of CO. This is typically done to maximize the amount of $H_2$ in the reforming effluent. In some aspects, such conventional water gas shift reaction conditions can be used to increase the $H_2$ content of the reforming effluent to form a shifted synthesis gas product. In such aspects, the shifted synthesis gas product can include a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more.

In other aspects, a water gas shift reaction prior to pressure swing adsorption can be operated to reduce the concentration of CO in the shifted synthesis gas product by 40% to 80%, or 50% to 80%, or 50% to 70%. In such aspects, the CO remaining in the shifted synthesis gas product after water gas shift can be separated with $CO_2$ during swing adsorption. While this does not substantially change the net amount of carbon in the tail gas after swing adsorption, it does increase the fuel value by including a larger amount of CO. The increased amount of CO in the tail gas can allow the amount of other fuel used in the regeneration step to be reduced by a corresponding amount. In such aspects, the ratio of $H_2$ to CO in the shifted synthesis gas product can be between 4.0 and 10, or between 4.0 and 8.0.

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases, e.g. steam, can be used prior to, during, and/or after the reduction in pressure to facilitate release of the selectively (ad)sorbed component(s) (gas(es)). Depending on its nature, a fill PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

In various aspects, a reforming effluent can be used as the input flow for a pressure swing adsorption process. The synthesis gas can include $H_2$, $H_2O$, CO, and $CO_2$. In such aspects, $H_2O$, CO, and $CO_2$ can correspond to heavy components while $H_2$ can correspond to the light component. This can be achieved using commercially available adsorbents in the swing adsorber, such as adsorbents available from Air Products and Chemicals of Allentown, PA. The light component ($H_2$) can pass through the adsorber as a primary product stream. The adsorbed components can be desorbed using a pressure swing process to form a tail gas containing the previously adsorbed components. Depending on the aspect, some $H_2$ can be used as part of the sweep gas during desorption to prepare the adsorbent for the next adsorption cycle. Optionally, if additional removal of CO and/or $CO_2$ is desired, supplemental adsorption of CO and/or $CO_2$ can be performed before and/or after the pressure swing adsorption. Any components removed by supplemental adsorption can optionally be added to the tail gas from the swing adsorption process.

A full pressure swing adsorption cycle involves, at a minimum, an adsorption stage (for adsorbing one or more components from an input flow) and a desorption stage (to regenerated the adsorbent by removing the adsorbed components). In order to provide a continuous or semi-continuous output flow, a plurality of adsorbent beds can be used. The multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished, regenerating prior to at least one other PSA reactor satisfying the condition for switching reactors.

To perform a separation, at least a portion of the reforming effluent can be introduced into a PSA reactor. To facilitate adsorption of the heavy components, the reforming effluent can be cooled prior to introducing the effluent into the PSA reactor. Depending on the amount of cooling performed, the reforming effluent can have a temperature from 10° C. to 150° C. as it enters the PSA reactor, or 10° C. to 100° C., or 20° C. to 150° C., or 20° C. to 100° C. The pressure of the reforming effluent as it enters the PSA reactor can be 10 bar-a (~1.0 MPa-a) to 60 bar-a (~6.0 MPa-a), or 15 bar-a. (~1.5 MPa-a) to 50 bar-a (~5.0 MPa-a), or 20 bar-a (~2.20 MPa-a) to 60 bar-a (~0.5.0 MPa-a), or 10 bar-a (~1.0 MPa-a) to 40 bar-a (~4.0 MPa-a), or 10 bar-a (~1.0 MPa-a) to 30 bar-a (~3.0 MPa-a).

The feed can be passed through the PSA reactor until one or more pre-defined criteria is satisfied for switching the feed to another PSA reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of CO, $CO_2$, and/or $H_2O$ is detected in the product $H_2$ stream. Further additionally or alternately, the feed can be passed into the reactor until the amount of $CO_2$ and/or $H_2O$ that has entered the reactor is approximately equal to a threshold value of the adsorbent capacity of the reactor. In such a situation, for example, the feed can be passed into the reactor until the amount of $H_2O$ and/or $CO_2$ that has entered the reactor is equal to 75% or more of the adsorbent capacity of the adsorbent material in the reactor, or 80% or more, or 85% or more, or 90% or more, such as up to 100% or possibly still higher. A typical PSA cycle can involve introducing feed into the reactor for about 30 seconds to about 300 seconds, e.g., for about 60 seconds to about 120 seconds.

One or more purge gas flows can be used to remove the adsorbed $CO_2$, $H_2O$, and CO from the reactor. One option can include using a hydrogen-containing purge to assist with desorbing the adsorbed components.

In another aspect, the adsorbent particles can be assembled into an ordered structure such as a monolith. Conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/ adhered together in the mass to form a coherent, self-supporting body. The masses can then be placed in the vessel with the gas passages aligned in the desired orientation to form an ordered adsorbent bed. The void fraction within the adsorbent—that is, the ratio of the void volume due to porosity of solid adsorbents (including micropores and macropores) and also void volume due to gas flow channels or interstices to the volume of the vessel containing the adsorbent-should be less than 0.5, or less than 0.3.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

As an example, a reverse flow reactor system can include first and second reactors, oriented in a series relationship with each other with respect to a common flow path, and optionally but preferably along a common axis. The common axis may be horizontal, vertical, or otherwise. In other examples, a reverse flow reactor system can correspond to a single reactor that includes both a reaction zone and a recuperation zone. During a regeneration step, reactants (e.g., fuel and oxygen) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to reduce or minimize waste of heat and overheating the second reactor. This heat is transferred, for example, to one or more surfaces in the second reactor and/or in the reaction zone for the endothermic reaction in a reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment. In aspects where a single reactor is used, the heat produced by the reaction can be displaced into and/or at least partially through the combustion zone of the reactor, but preferably the displacement can also reduce or minimize waste of heat due to exit of heated gas from the reactor.

After regeneration or heating the second reactor media (which can include and/or correspond to one or more surfaces including a catalyst for an endothermic reaction), in the next/reverse step or cycle, reactants for the endothermic reaction can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

For some aspects, the basic two-step asymmetric cycle of a reverse flow regenerative bed reactor system can be described in terms of a reactor system having two zones/ reactors; a first or recuperator/quenching zone and a second or reaction zone. Both the reaction zone and the recuperator zone can contain regenerative monoliths and/or other regenerative structures formed from a doped ceramic composition. Regenerative monoliths or other regenerative structures, as used herein, comprise materials that are effective in storing and transferring heat as well as being, effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description, the reactor is described herein with reference to a reforming reaction. At the beginning of the "reaction" step of the cycle, a secondary end of the reaction zone (a.k.a. herein as the second reactor) can be at an elevated temperature as compared to the primary end of the reaction zone, and at least a portion (including the first end) of the recuperator or quench zone (a.k.a. herein as the first reactor), can be at a lower temperature than the reaction zone to provide a quenching effect for the resulting product. In an aspect where the reactors are used to perform reverse flow reforming, a methane-containing reactant feed (or other hydrocarbon-containing reactant feed) can be introduced via a conduit(s), into a primary end of the reforming or reaction zone. In various aspects, the hydrocarbon-containing reactant feed can also contain $H_2O$, $CO_2$, or a combination thereof.

The feed stream from inlet(s) can absorb heat from reaction zone and endothermically react to produce the desired synthesis gas product. As this step proceeds, a shift in the temperature profile, can be created based on the heat transfer properties of the system. When the ceramic catalyst monolith/other catalyst structure is designed with adequate heat transfer capability, this profile can have a relatively sharp temperature gradient, which gradient can move across the reaction zone as the reforming step proceeds. In some aspects, a sharper temperature gradient profile can provide for improved control over reaction conditions. In aspects where another type of endothermic reaction is performed, a similar shift in temperature profile can occur, so that a temperature gradient moves across reaction zone as the reaction step proceeds.

The effluent from the reforming reaction, which can include unreacted feed components (hydrocarbons, $H_2O$, $CO_2$) as well as synthesis gas components, can exit the reaction zone through a secondary end at an elevated temperature and pass through the recuperator reactor, entering through a second end, and exiting at a first end. The recuperator can initially be at a lower temperature than the reaction zone. As the products (and optionally unreacted feed) from the reforming reaction pass through the recuperator zone, the gas can be quenched or cooled to a temperature approaching the temperature of the recuperator zone substantially at the first end, which in some embodiments can be approximately the same temperature as the regeneration feed introduced via conduit into the recuperator during the second step of the cycle. As the reforming effluent is cooled in the recuperator zone, a temperature gradient can be created in the zone's regenerative bed(s) and can move across the recuperator zone during this step. The quenching can heat the recuperator, which can be cooled again in the second step to later provide another quenching service and to prevent the size and location of the heat bubble from growing progressively through the quench reactor. After quenching, the reaction gas can exit the recuperator at via conduit and can be processed for separation and recovery of the various components.

The second step of the cycle, referred to as the regeneration step, can then begin with reintroduction of the first and second regeneration reactants via conduit(s). The first and second reactants can pass separately through hot recuperator toward the second end of the recuperator, where they can be combined for exothermic reaction or combustion in or near a central region of the reactor system.

Regeneration can entail transferring recovered sensible heat from the recuperator zone to the reaction zone to thermally regenerate the reaction beds for the subsequent reaction cycle. Regeneration gas/reactants can enter recuperator zone, such as via conduit(s), and flow through the recuperator zone and into the reaction zone. In doing so, the temperature gradients and may move across the beds similar to but in opposite directions to the temperature gradients developed during the reaction cycle. Fuel and oxidant reactants may combust at a region proximate to the interface of the recuperator zone and the reaction zone. The heat recovered from the recuperator zone together with the heat of combustion can be transferred to the reaction zone, thermally regenerating the regenerative reaction monoliths and/or beds disposed therein.

In some aspects, several of the conduits within a channel may convey a mixture of first and second reactants, due at least in part to some mixing at the first end of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Another exemplary reactor system that may be suitable in some applications for controlling and deferring the combustion of fuel and oxidant to achieve efficient regeneration heat is a single reactor system. The reactor system may be considered as comprising two reactor zones. The recuperator can be the zone primarily where quenching takes place and provides substantially isolated flow paths or channels for transferring both of the quenching reaction gases through the reactor media, without incurring combustion until the gasses arrive proximate or within the reactor core. The reformer can be the reactor where regeneration heating and methane (and/or hydrocarbon) reformation primarily occurs, and may be considered as the second reactor for purposes herein. Although the first and second reactors in the reactor system are identified as separately distinguishable reactors, it is understood that the first and second reactors may be manufactured, provided, or otherwise combined into a common singe reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors. However, various aspects can comprise a reactor system whereby the recuperator reactor includes conduits and channels as described herein, and the reformer reactor may similarly possess conduits. Additionally or alternately, some aspects may include a reformer reactor bed that is arranged different from and may even include different materials from, the recuperator reactor bed.

As discussed previously, the first reactor or recuperator can include various gas conduits for separately channeling two or more gases following entry into a first end of the recuperator and through the regenerative bed(s) disposed therein. A first gas can enter a first end of a plurality of flow conduits. In addition to providing a flow channel, the conduits can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

In aspects where a monolith is used, the monolith can have any convenient shape suitable for use as a catalytic surface. An example of a monolith can be an extruded honeycomb monolith. Honeycomb monoliths can be extruded structures that comprise many (e.g, a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter characteristic cell side length of only a few millimeters, such as on the order of roughly one millimeter. Reactor media components, such as the monoliths or alternative bed media, can provide for channels that include a packing with an average wetted surface area per unit volume that ranges from 50 $ft^{-1}$ to 3000 $ft^{-1}$ (~0.16 $km^{-1}$ to ~10 $km^{-1}$), or from 100 $ft^{-1}$ to 2500 $ft^{-1}$ (~0.32 $km^{-1}$ to ~8.2 $km^{-1}$), or from 200 $ft^{-1}$ to 2000 $ft^{-1}$ (~0.65 $km^{-1}$ to ~6.5 $km^{-1}$), based upon the volume of the first reactor that is used to convey a reactant. These relatively high surface area per unit volume values can aid in achieving a relatively quick change in the temperature through the reactor.

Reactor media components can also provide for channels that include a packing that includes a high volumetric heat transfer coefficient (e.g., 0.02 cal/$cm^3$ s° C. or more, or 0.05 cal/$cm^3$ s° C. or more, or 0.10 cal/cal/$cm^3$ s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/$cm^3$ s° C. or more, or 0.20 cal/cm's° C. or more). As with the high surface area values, these relatively high volumetric heat transfer coefficient values and/or other properties can aid in achieving a relatively quick change in the temperature through the reactor. The cited values are averages based upon the volume of reactor used for conveyance of a reactant.

In various aspects, adequate heat transfer rate can be characterized by a heat transfer parameter, ΔTHT, below 500° C., or below 100° C., or below 50° C. The parameter ΔTHT, as used herein, is the ratio of the bed-average volumetric heat transfer rate that is needed for recuperation, to the volumetric heat transfer coefficient of the bed, hv. The volumetric heat transfer rate (e.g. cal/$cm^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. $cm^3$) of the reactor (or portion of a reactor) traversed by the gas. The volumetric heat transfer coefficient of the bed, hv, can typically be calculated as the product of an area-based coefficient (e.g. cal/$cm^2$ s°

C.) and a specific surface area for heat transfer (av, e.g. $cm^2/cm^3$), often referred to as the wetted area of the packing.

In some aspects, a washcoat can be added to the formed, sintered ceramic composition. A washcoat can allow the sintered ceramic composition to be impregnated with additional catalytic metal.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu. Ag, Au, Zr, Cr, Ti, V, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In an example, a gas distributor can direct a second gas stream to second gas stream channels that are substantially isolated from or not in fluid communication with the first gas channels, here illustrated as channels. The result can be that at least a portion of gas stream is kept separate from gas stream during axial transit of the recuperator. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) can each comprise a component that reacts with a component in the other reactant to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator. In this manner, the majority of the first reactant can be kept isolated from the majority of the second reactant, and the majority of the heat release from the reaction of combining reactants can take place after the reactants begin exiting the recuperator. The reactants can be gases, but optionally some reactants may comprise a liquid, mixture, or vapor phase.

The percent reaction for these regeneration streams is meant the percent of reaction that is possible based on the stoichiometry of the overall feed. For example, if a first gas comprised 100 volumes of air (80 volumes $N_2$ and 20 volumes $O_2$), and a second gas comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone, this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator.

In various aspects, channels can comprise ceramic (including zirconia), alumina, or other refractory material capable of withstanding temperatures exceeding 1200° C., or 1400° C., or 1600° C. Additionally or alternately, channels can have a wetted area between 50 ft$^{-1}$ and 3000 ft$^{-1}$, or between 100 ft$^{-1}$ and 2500 ft$^{-1}$ or between 200 ft$^{-1}$ and 2000 ft$^{-1}$.

The reactor system can include a first reactor containing a first end and a second end, and a second reactor containing a primary end and a secondary end. Reference made to an "end" of a reactor merely refers to a distal portion of the reactor with respect to an axial mid-point of the reactor. Thus, to say that a gas enters or exits an "end" of the reactor, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

Process Example—Reverse Flow Reforming and Regeneration

An example of a reaction that can be performed in a reverse flow reactor system is reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step. During reactor regeneration, fuel, an oxidant, and a diluent are introduced into the reactor from a regeneration end of the reactor. The bed and/or monoliths in the regeneration section of the reactor can absorb heat, but at least a portion of the regeneration section typically does not include a catalyst for reforming. As the fuel and oxidant pass through the regeneration section, heat is transferred from the regeneration section to the fuel and oxidant. Combustion does not occur immediately, but instead the location of combustion is controlled to occur in a middle portion of the reactor. The flow of the fuel, oxidant, and diluent continues during the regeneration step, leading to additional transfer of the heat generated from combustion into the reaction zone/the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (2)-(4).

$$Dry\ Reforming:\ CH_4+CO_2=2CO+2H_2 \tag{2}$$

$$Steam\ Reforming:\ CH_4+H_2O=CO+3H_2 \tag{3}$$

$$Bi\ Reforming:\ 3CH_4+2H_2O+CO_2=4CO+8H_2. \tag{4}$$

As shown in equations (2)-(4), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium.

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (2)-(4) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to coot prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternately, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. It is noted that the location of combustion catalyst within the reactor(s) can overlap with the location of reforming catalyst within the reactor(s), so that some portions of the reactor(s) can correspond to both combustion zone and reaction zone. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$ and oxygen can be introduced into the reactor and combusted. The location where the fuel and oxidant are allowed to mix can be controlled in any convenient manner, such as by introducing the fuel and oxidant via separate channels. By delaying combustion during regeneration until the reactants reach a central portion of the reactor, the non-reforming end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 1100° C. or more, or 1200° C. or more, or 1300° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Of course, in other aspects the balance of heat between reforming and regeneration can be determined in other manners, such as by determining desired flow rates for the reactants and then selectin cycle lengths so that the heat provided by regeneration balances with the heat consumed during reforming.

In addition to providing heat, the reactor regeneration step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during reforming can be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 5° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternately with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C. or 1200° to 1400° C.

Additionally or alternately, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 $hr^{-1}$ to 50,000 $hr^{-1}$ The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e, steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternately, the reaction conditions can be suitable for conversion of 10 wt % to 100 wt % of the hydrocarbons in the reforming feed, or 20N wt % to 80 wt %, or 50 wt % to 100 wt %, or 80 wt % to 100 wt %, or 10 wt % to 98 wt %, or 50 wt to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of H to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Example 1—Laminar Flame Speeds at Elevated Temperature

A combustion model was used to determine the how the laminar flame speed changes based on changes in the composition of a diluent gas during combustion. In the modeled combustion reactions, a gas flow of $H_2$, $O_2$, and diluent was combusted. The amount of fuel corresponding to roughly 10% of the total gas flow. In a first set of tests, combustion was modeled at temperatures of 400° C., 500° C., 600° C., and 700° C. while using diluents that had various amounts of $CO_2$. At temperatures of 500° (C or less, the nature of the diluent gas had little or no impact on flame speed. However, at temperatures of 600° C. or more, the diluent gas corresponding to 100 vol % $N_2$ shows a substantial increase in flame speed. As $CO_2$ is blended into the diluent, the increase in flame speed is reduced, with unexpectedly large reductions in flame speed for $CO_2$ amounts of 10 vol % or more in the diluent. At 25 vol % or 30 vol % $CO_2$, the flame speed at 600° C. or more is reduced almost to the flame speed values at 500° or less.

It is noted that the model results correspond to the flame speed for the combustion of $H_2$. The combustion of $H_2$ will result in production of $H_2O$. Any impact on the flame speed due to the $H_2O$ produced by combustion is therefore incorporated into the model results.

The flame speed curves for $H_2O$ are similar to the flame speed curves for $CO_2$. Thus, even though the heat capacities of $H_2O$ and $CO_2$ differ by more than 10%, the flame speed reduction is similar for both. At 700° C. it appears that addition of $H_2O$ provides a slightly greater reduction in flame speed than $CO_2$.

Example 2—Regeneration Diluent Including 30% High Heat Capacity Gas

A pilot scale reactor (length of ~12 inches/~30 cm) was used to investigate the impact and benefits of modifying flue gas exit temperatures on operation of a reverse flow reactor system. The examples provided herein correspond to results from a single reactor, but those of skill in the art will readily understand the application of the following results to reaction systems including plurality of reverse flow reactors.

The pilot reactor was used to perform steam reforming in a reverse flow reactor using various types of diluent gases. The steam reforming was performed at a methane feed rate of 2 scf/min. The flow rate during the regeneration step was roughly 18 scf/min (~510 liters/min). This included roughly 16.1 scf/min (~455 liters/min) of diluent and 1.9 scf/min (~55 liters/min) of $H_2$ as a fuel The pressure in the reactor for both the reaction step and the regeneration step was 150 psig (~1000 kPa-g).

The composition of the fuel and diluent changed over time during the regeneration steps in the reactor. Initially, 10.6 vol % of the flow into the reactor during regeneration corresponded to H as a fuel. During the initial period, $N_2$ was used as substantially the entire diluent, although some smaller amounts of other gases typically present in air were included due to using air to provide the oxidant for the combustion reaction. These other gases corresponded to less than 15 vol % of the diluent.

In order to characterize the reactor, the temperature was sampled at 4 inches (~10 cm) from the end of the reactor where the regeneration gases enter. This location roughly corresponds to the location of the maximum in the temperature profile within the reactor. The temperature at the measured location reactor during the initial period was slightly greater than 1200° C. The temperature cycled between a maximum of roughly 1220° C. at the end of the regeneration step and a minimum of roughly 800° C. at the end of the methane reforming step. This represents a temperature differential between the regeneration step and the reaction step of roughly 420° C.

After roughly 500 seconds of operation, 5.0 standard cubic feet per minute (~140 liters/min) of the $N_2$ diluent was replaced with 5.0 standard cubic feet per minute (1-40 liters/min) of $CO_2$. This corresponded to replacing roughly 30 vol % of the diluent with $CO_2$. The temperature, pressure, and volume of the other input flows were kept the same. This resulted in a decrease of the maximum temperature from greater than 1200° C. to less than 1100° C., Next, fuel composition is increased to bring peak temperatures back up to greater than 1200° C. In this way, higher fuel compositions were used to create the same temperature profile within the reactor. This is achieved by reducing total diluent by roughly 15%, Although the regeneration volumetric flow during regeneration decreased, the amount of reforming performed during the reaction step remained substantially the same. This demonstrates that $CO_2$ can be used to replace $N_2$ as diluent to reduce regeneration volumetric flows within the reactor while still achieving similar reactivity. The reactor was operated under these conditions for roughly 2000 seconds to confirm that the reduced operating temperature could be maintained while also maintaining the same or a similar level of activity during the reaction step.

At 2500 seconds, additional $N_2$ was removed from the diluent. Instead of replacing the $N_2$ with other diluent, the amount of $H_2$ was increased from 10.6 vol % of the input flow to roughly 12.2 vol %. This increase in the amount of fuel represents a process intensification, as the additional heat generated during regeneration allowed additional reforming to be performed during the reaction step. This increased the maximum temperature in the reactor back to a temperature of slightly more than 1200° C. Thus, replacing roughly 10 vol % of the diluent during regeneration with $CO_2$ allowed for an increase in the amount of fuel used during regeneration of ~0.5 vol % (or an increase of ~15% relative to the starting amount), thus allowing for conversion of additional methane to $H_2$ during the reaction step.

For methane conversion versus cycle time, modifying the diluent to include 30 vol % $CO_2$ resulted in substantially the same conversion as operating the regeneration step with only $N_2$ as the diluent.

Example 3 Configuration and Process Flow for Commercial Scale Integration

This prophetic example provides an example of relative flow rates for integration of RFR reforming with ammonia production on a commercial scale. In this example, a process flow is illustrated that would result in production of roughly 4000 tons per day of ammonia. The process flow can be performed in a configuration similar to the configuration shown in FIG. 3.

In this example, an air separation unit is used to generate 2300 tons per day of $O_2$. This oxygen can be used in the regeneration step of a reverse flow reactor being used for reforming of hydrocarbons. Between the fuel for regeneration and the hydrocarbons for reforming, 4850 MMBTU/hr of natural gas can be consumed by the reformer to produce an $H_2$-containing stream. Roughly 6750 tons per day of $CO_2$ is also generated at a pressure of roughly 3000 kPa-g, in the form of a flue gas that also contains $H_2O$.

The $H_2$-containing stream can have a molar ratio of $H_2$ to CO of roughly 3:1. This can be passed through a water gas shift stage to increase or maximize $H_2$ production. One or more separation stages, such as pressure swing adsorption separation stages, can then be used to separate a high purity $H_2$ stream from the shifted product. The shifted product can then be methanated, and optionally passed through additional CO and/or $H_2O$ trap stages, prior to being passed into an ammonia synthesis reactor. The high purity nitrogen from the air separation unit can also be passed into the ammonia synthesis stage in order to form roughly 4000 tons per day of ammonia. It is noted that based on the volume of air that is separated in the air separation unit, the amount of $H_2$ produced during reforming is greater than the corresponding stoichiometric amount of $N_2$ produced by the air separation. As a result, an excess $H_2$ stream of roughly 210 tons per day can be formed as an additional product.

Additional Embodiments

Embodiment 1. A method for performing reforming, comprising: reacting a fuel mixture comprising a fuel stream, an oxygen-containing stream comprising 10 vol % or less $N_2$ relative to a volume of the oxygen-containing stream, and a recycle stream under combustion conditions comprising a combustion pressure of 0.7 MPa-g or more in a combustion zone within a reactor to form a flue gas and to heat one or more surfaces in a reaction zone to a regenerated surface temperature of 600° C. or more, the reaction zone comprising a catalyst composition, the fuel mixture comprising 0.1 vol % or more $O_2$ and 20 vol % or more Co relative to a volume of the fuel mixture; separating, from the flue gas, at least a portion of the recycle stream and a $CO_2$-containing stream comprising a second pressure of 0.5 MPa-g or more; exposing a hydrocarbon-containing stream to the catalyst composition in the reaction zone at the regenerated surface temperature under reforming conditions to form a reforming product stream comprising $H_2$ and CO, a direction of flow for the hydrocarbon-containing stream within the reaction zone being reversed relative to a direction of flow for the fuel mixture; forming an $H_2$-containing stream comprising 50 vol % or more $H_2$ from at least a portion of the reforming product stream; methanating at least a portion of the $H_2$-containing stream to form a methanated $H_2$-containing stream; and exposing the methanated $H_2$-containing stream to ammonia synthesis conditions in the presence of $N_2$ to form an ammonia-containing product, wherein optionally at least one of the recycle stream and the fuel mixture comprises 15 vol % or less of $N_2$.

Embodiment 2. The method of Embodiment 1, further comprising separating at least a portion of the oxygen-containing stream and an $N_2$-containing stream from air, and optionally wherein exposing the methanated $H_2$-containing stream to ammonia synthesis conditions comprises exposing the methanated Ha-containing stream and at least a portion of the N-containing stream to ammonia synthesis conditions.

Embodiment 3. The method of any of the above embodiments, wherein the method further comprises compressing the flue gas prior to separating the fuel gas to form at least the $CO_2$-containing stream and the recycle stream; or wherein the recycle stream comprises 25 vol % or more $CO_2$ relative to a volume of the recycle stream; or a combination thereof.

Embodiment 4. A method for performing reforming, comprising: reacting a fuel mixture comprising a fuel stream and an oxygen-containing stream under combustion conditions in a combustion zone within a reactor to form a flue gas and to heat one or more surfaces in a reaction zone to a regenerated surface temperature of 600° C. or more, the reaction zone comprising a catalyst composition, the oxygen-containing stream further comprising $N_2$, the fuel mixture comprising 0.1 vol % or more $O_2$ relative to a volume of the fuel mixture; separating, from the flue gas, an N-containing stream comprising 95 vol % or more $N_2$; exposing a hydrocarbon-containing stream to the catalyst composition in the reaction zone at the regenerated surface temperature under reforming conditions to form a reforming product stream comprising $H_2$ and CO, a direction of flow for the hydrocarbon-containing stream within the reaction zone being reversed relative to a direction of flow for the fuel mixture; forming, an $H_2$-containing stream comprising 50 vol % or more $H_2$ from at least a portion of the reforming product stream; methanating at least a portion of the $H_2$-containing stream to form a methanated stream; and exposing the methanated stream and at least a portion of the N-containing stream to ammonia synthesis conditions to form an ammonia-containing product.

Embodiment 5. The method of Embodiment 4, wherein the flue gas is substantially free of $O_2$.

Embodiment 6. The method of any of the above embodiments, wherein forming an $H_2$-containing stream from at least a portion of the reforming product stream comprises: exposing the reforming product stream to water gas shift reaction conditions to form a shifted synthesis gas product stream; and separating the shifted synthesis gas product stream to form the $H_2$-containing stream and a stream comprising $CO_2$, the $H_2$-containing stream optionally comprising 90 vol % or more $H_2$, the separating optionally comprising performing pressure swing adsorption to form the $H_2$-containing product stream.

Embodiment 7. The method of any of the above embodiments, wherein the $CO_2$-containing stream comprises 90 vol % or more $CO_2$, the method further comprising exposing at least a portion of the ammonia-containing product and at least a portion of the $CO_2$-containing stream to urea synthesis conditions to form a urea-containing product.

Embodiment 8. The method of any of the above embodiments, wherein the $CO_2$-containing stream comprises 0.9 vol % or less of CO.

Embodiment 9. The method of any of the above embodiments, wherein the combustion conditions comprise a combustion pressure of 1.0 Mpa-g or more, or wherein the second pressure is 1.0 Ma-g or more, or a combination thereof.

Embodiment 10. The method of any of the above embodiments, i) wherein the regenerated surface temperature is 1000° C. or more; ii) wherein the reactor comprises a reverse flow reactor; iii) wherein the reactor comprises a reactor system, the reactor system comprising a recuperator portion and a portion including the reaction zone; or iv) a combination of two or more of i), ii), and iii).

Embodiment 11. An ammonia synthesis system comprising: a reactor comprising a reactor inlet at a first end of the reactor, a regenerator inlet at a second end of the reactor, and a reaction zone comprising reforming catalyst; a recycle loop providing intermittent fluid communication between the reactor inlet and the regenerator inlet, the recycle loop comprising a recycle compressor, a fuel source inlet, an oxygen-containing gas inlet, and a $CO_2$-containing gas outlet; an air separation unit in fluid communication with the oxygen-containing gas inlet; a pressure swing adsorption separator, the regenerator inlet being in intermittent fluid communication with the pressure swing adsorption separator; a methanation stage in fluid communication with the regenerator inlet via the pressure swing adsorption separator; and an ammonia synthesis stage in fluid communication with the methanation stage.

Embodiment 12. The ammonia synthesis system of Embodiment 11, wherein the system further comprises: a water separation stage in fluid communication with the $CO_2$-containing gas outlet; and a urea synthesis stage in fluid communication with the water separation stage and the ammonia synthesis stage.

Embodiment 13. The ammonia synthesis system of Embodiment 11 or 12, wherein the methanation stage is further in fluid communication with the air separation unit.

Embodiment 14. The ammonia synthesis system of any of Embodiments 11 to 13, wherein the pressure swing adsorption separator is in intermittent fluid communication with the regenerator inlet via a water gas shift reaction stage.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing reforming, comprising:
   reacting a fuel mixture comprising a fuel stream and an oxygen-containing stream under combustion conditions in a combustion zone within a reactor to form a flue gas and to heat one or more surfaces in a reaction zone to a regenerated surface temperature of 600° C. or more, the reaction zone comprising a catalyst composition, the oxygen-containing stream further comprising $N_2$, the fuel mixture comprising 0.1 vol % or more $O_2$ relative to a volume of the fuel mixture;
   separating, from the flue gas, an $N_2$-containing stream comprising 95 vol % or more $N_2$;
   exposing a hydrocarbon-containing stream to the catalyst composition in the reaction zone at the regenerated surface temperature under reforming conditions to form a reforming product stream comprising $H_2$ and CO, a direction of flow for the hydrocarbon-containing stream within the reaction zone being reversed relative to a direction of flow for the fuel mixture; and
   forming an $H_2$-containing stream comprising 50 vol % or more $H_2$ from at least a portion of the reforming product stream; methanating at least a portion of the $H_2$-containing stream to form a methanated stream; and exposing the methanated stream and at least a portion of the $N_2$-containing stream to ammonia synthesis conditions to form an ammonia-containing product,
   i) wherein the reactor comprises a reverse flow reactor;
   ii) wherein the reactor comprises a reactor system, the reactor system comprising a recuperator portion and a portion including the reaction zone; or iii) a combination of i) and ii).

2. The method of claim 1, wherein the flue gas is free of $O_2$.

3. The method of claim 1, wherein forming an $H_2$-containing stream from at least a portion of the reforming product stream comprises:
   exposing the reforming product stream to water gas shift reaction conditions to form a shifted synthesis gas product stream; and
   separating the shifted synthesis gas product stream to form the $H_2$-containing stream and a stream comprising $CO_2$, the $H_2$-containing stream optionally comprising 90 vol % or more $H_2$, the separating optionally comprising performing pressure swing adsorption to form the $H_2$-containing product stream.

4. The method of claim 3, wherein the $CO_2$-containing stream comprises 90 vol % or more $CO_2$, the method further comprising exposing at least a portion of the ammonia-containing product and at least a portion of the $CO_2$-containing stream to urea synthesis conditions to form a urea-containing product.

5. The method of claim 3, wherein the $CO_2$-containing stream comprises 0.9 vol % or less of CO, or wherein the $CO_2$-containing stream comprises a pressure of 1.0 MPa-g or more, or a combination thereof.

6. The method of claim 1, wherein the combustion conditions comprise a combustion pressure of 1.0 Mpa-g or more.

7. The method of claim 1, wherein the regenerated surface temperature is 1000° C. or more.

* * * * *